US006420006B1

(12) United States Patent
Scott

(10) Patent No.: US 6,420,006 B1
(45) Date of Patent: Jul. 16, 2002

(54) REMOVABLE LABEL FLAP INCLUDING HIDDEN COUPON

(75) Inventor: Barry M. Scott, West Bend, WI (US)

(73) Assignee: Prime Label & Screen, Inc., Pewaukee, WI (US)

( * ) Notice: Subject to any disclaimer, the term of this patent is extended or adjusted under 35 U.S.C. 154(b) by 0 days.

(21) Appl. No.: 09/531,742

(22) Filed: Mar. 21, 2000

(51) Int. Cl.[7] .................................................. B32B 7/12
(52) U.S. Cl. ......................... 428/40.1; 428/42.1; 283/81
(58) Field of Search ................................ 428/40.1, 42.1, 428/42.2, 201, 202, 192, 914; 283/81

(56) References Cited

U.S. PATENT DOCUMENTS

| | | | | |
|---|---|---|---|---|
| 3,524,271 A | | 8/1970 | Buske | 40/2 |
| 3,524,782 A | | 8/1970 | Buske | 156/248 |
| 4,060,168 A | | 11/1977 | Romagnoli | 206/216 |
| 4,846,504 A | * | 7/1989 | MacGregor et al. | 283/102 |
| 5,741,381 A | * | 4/1998 | Dolence et al. | 156/64 |
| 6,113,271 A | * | 9/2000 | Scott et al. | 383/211 |

* cited by examiner

*Primary Examiner*—C. Melissa Koslow
*Assistant Examiner*—Shalie Manlove
(74) *Attorney, Agent, or Firm*—Andrus, Sceales, Starke & Sawall, LLP

(57) ABSTRACT

A method of manufacturing a label assembly including a plurality of individual label flaps each including a separate coupon includes the steps of imprinting a coupon graphic on a first release liner and printing a label graphic on a continuous strip of label material. The coupon shape is die-cut into the first release liner in a position aligned with the label flap to be subsequently formed. Once the coupon has been die-cut from the first release liner, the first release liner is separated from the label material. As the first release liner separates from the label material, the die-cut coupon remains in contact with the pressure-sensitive adhesive formed on the back surface of the label material. A second release liner is brought into contact with the continuous strip of label material including the coupons. The label shape is then die-cut and the portions of the label material not forming the label flap are removed to leave a series of spaced labels each including a coupon mounted onto the continuous strip of the second release liner.

9 Claims, 5 Drawing Sheets

REMOVABLE LABEL FLAP INCLUDING HIDDEN COUPON

BACKGROUND OF THE INVENTION

The present invention relates to a resealable label flap that is positionable to cover an opening in a product package containing removable articles such that the label flap can be repeatedly removed and reapplied to access the articles contained within the package. More specifically, the present invention relates to a label flap that includes a separate coupon that is hidden beneath the label flap and is revealed the first time the label flap is removed from the product package.

Resealable label flaps are commonly used with product packages that include packaged sheet-like removable articles that have been thoroughly wetted with a liquid prior to packaging. The product package is generally constructed from a thin, liquid impervious material that has an opening over which the label flap is removably adhered. Typically, the label flap is a strip of flexible or semi-rigid thermoplastic material having a pressure-sensitive removable adhesive applied to one surface of the label. The removable adhesive creates a generally air-tight seal around the package opening to prevent the packaged removable articles from drying out during storage.

In the retail industry, a common marketing practice is to include a coupon within or on the packaging for a product such that the purchaser of the product can receive a discount on subsequently purchased merchandise. A key feature of this type of marketing is the concealment of the coupon until the product package has been purchased and opened such that the purchaser is required to purchase another product to redeem the coupon.

In some types of packaging, it is undesirable to place the coupon within the product package since the packaged product may damage the coupon. To solve this problem, various systems have been developed to secure the coupon to the exterior of the product package while at the same time preventing the easy pilfering of the coupon from the package prior to the purchase of the package.

The Buske U.S. Pat. Nos. 3,524,271 and 3,524,782 each disclose a combination label and coupon in which the coupon graphics are printed on the back surface of the label liner. The shape of the coupon is then scored or cut into the label liner around the coupon graphics. As the printed labels are separated from the liner, the coupon remains in contact with the label such that when the label is applied to the package, the label covers the coupon and prevents its removal from the package. Although this combination of label and coupon has proved to be somewhat successful, the manufacturing process for the label has limited the size and position of the coupon with respect to the overlaying label. Specifically, the size and position of the coupon are limited due to the strength of the label liner, since the label liner has a tendency to tear when the label is removed if only a small amount of material remains between the coupon and the edge of the label liner.

The Romengali U.S. Pat. No. 4,060,168 discloses a similar label assembly in which a series of printed labels are arranged in serial order and a die-cut portion of the label liner in contact with the printed labels remains adhered to the label upon application of the label to a container. As illustrated in the patent, when the label is removed from the label liner, the coupon is torn from the liner. A limitation of the system disclosed in this patent is that the liner must be of sufficiently light weight to permit the label to be torn from the liner as the label itself is removed. Therefore, because of the limitation in the strength of the label liner, high speed removal and application of the combined label and coupon is not possible or practical.

Therefore, it is an object of the present invention to provide a method of manufacturing a plurality of removable label flaps that each include a separate coupon and are contained on a label liner of sufficient strength. Further, it is an object of the present invention to provide a label flap that includes a separate coupon adhesively attached to the label flap such that the coupon is invisible upon initial removal of the label flap from a product package. Further, it is an object of the present invention to provide a method of manufacturing such label flaps in which the coupon is printed and removed from a first liner prior to the label material being placed in contact with a second liner of increased strength.

SUMMARY OF THE INVENTION

The present invention is a method of manufacturing a continuous label assembly that includes a plurality of removable label flaps that each include a separate coupon. The label assembly of the present invention can be wound around a supply roll and shipped to an off-site location for application of the individual label flaps, including the coupons, to a product package.

Initially, a continuous supply of material including a continuous strip of label material adhered to a first release liner by a pressure-sensitive adhesive is received by the processing machinery. After receipt, a series of coupon graphics are imprinted on the back surface of the first release liner in positions that generally correspond to the shape of the label flap to be subsequently formed. After the coupon graphics have been printed, a series of spaced label graphics are imprinted on the front surface of the label material in locations that also generally correspond to the position of the individual label flaps to be subsequently formed.

After the label graphics and the coupon graphics have been printed on the supply material, the first release liner is die-cut around each of the coupon graphics to form the plurality of individually spaced coupons. The size and shape of the coupon can vary greatly depending upon the customer requirements.

Once the coupons have been die-cut in the first release liner, the portions of the first release liner that do not form the coupon are removed from contact with the label material and discarded as waste. Since the label material includes the pressure-sensitive adhesive on its back surface, as the waste portions of the first release liner are removed, each of the die-cut coupons remain in contact with the label material.

Once the excess portions of the first release liner are removed, a second release liner is brought into contact with the label material including the plurality of spaced coupons. The second release liner is formed from a material more durable than the first release liner to aid in the subsequent removal and application of the label flaps to desired product packaging. The second release liner is preferably formed from plastic and provides the required stability and strength for the label assembly being formed.

After the label material including the spaced coupons is applied to the second release liner, the perimeter of the label flap is die-cut into the desired shape. The perimeter of the label flap is die-cut around the label graphic previously printed as well as the coupon attached to the back surface of the label material.

After the label flap has been die-cut, the excess portions of the label material are removed and the plurality of individual label flaps remain mounted on the second release liner. The label assembly including the plurality of individual label flaps and associated coupons mounted to the strip of the second release liner, is wound onto a supply roll. The supply roll including the continuous strip of the second release liner with the plurality of label flaps mounted thereto can be shipped to another location and the individual label flaps applied to product packaging.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
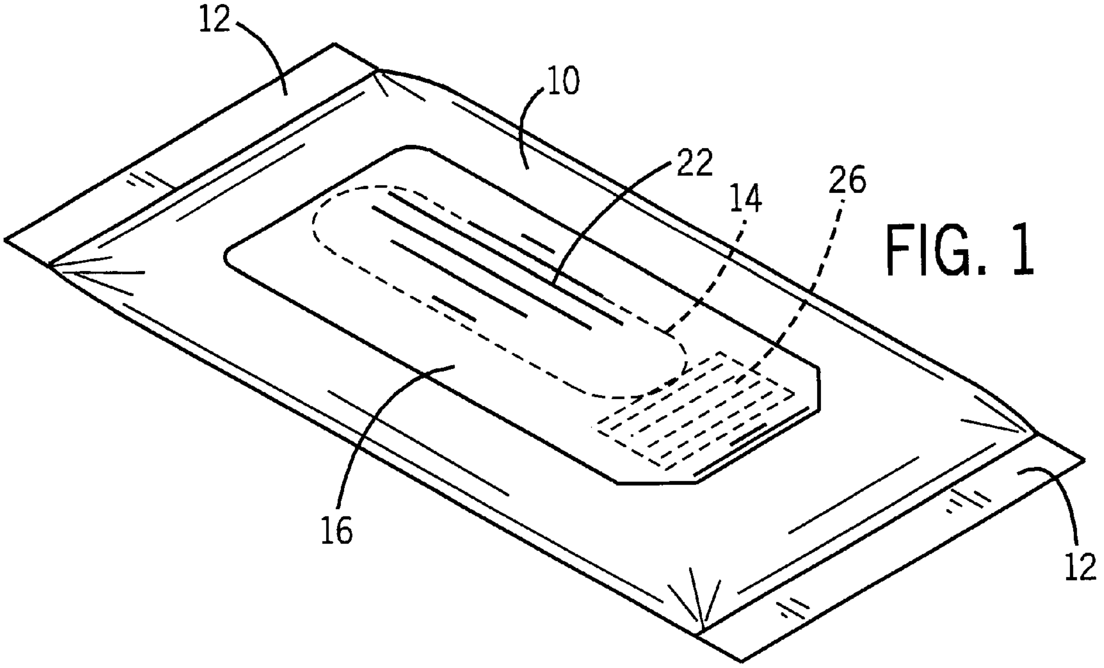
FIG. 1 is a perspective view of the resealable label flap and coupon of the present invention as applied to a product package containing removable articles.
Figure 2:
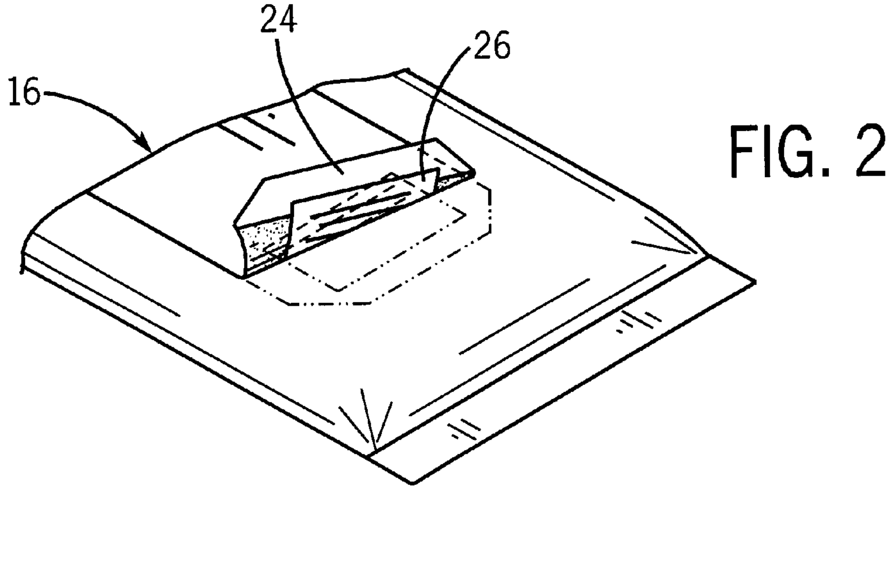
FIG. 2 is a partial perspective view illustrating the removal of the label flap and the uncovering of the coupon positioned therebelow.

FIGS. 1 and 2 generally illustrate a resealable product package 10 formed from a cylinder of liquid-impervious flexible thermoplastic material heat sealed on each end 12 to define an internal space for housing the removable articles contained within the product package 10. In the embodiment of the invention illustrated in FIGS. 1 and 2, the contents of the product package 10 comprise a series of stacked, individual cleaning cloths that can be impregnated with appropriate cleaning solutions. For example, the cleansing cloths of the product package 10 could be wetted baby wipes or hand towels.

The product package 10 includes an opening 14 through the package body to provide access to the internal space of the package body containing the cleansing cloths. As can be readily understood, the individual cloths can be removed from the internal space defined by the product package through the opening 14.

The product package 10 further includes a removable label flap 16 that is applied to the product package 10 to seal the product package 10 by covering the opening 14. The label flap 16 contacts the generally smooth, flat top surface of the product package 10 and forms a generally water and air-tight seal with the product package 10 around the opening 14. The water and air-tight seal around the opening 14 prevents contamination of the products contained within the product package 10. The label flap 16 is resealably attached to the upper surface of the product package 10 such that the label flap 16 can be repeatedly opened and resealed to provide access to the contents of the product package 10.

Figure 3:
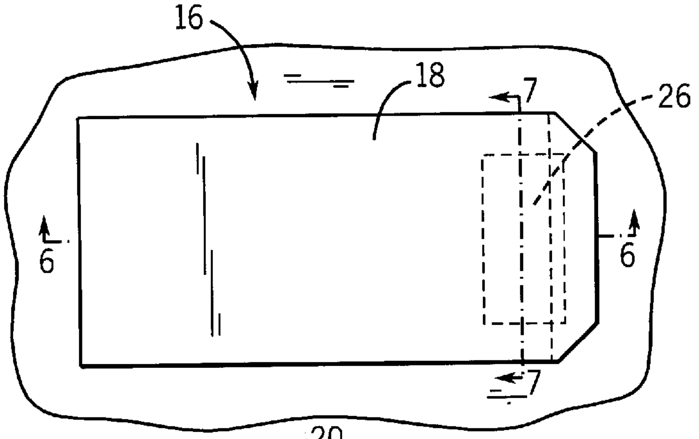
FIG. 3 is a top plan view of the label flap of the present invention.
Figure 4:
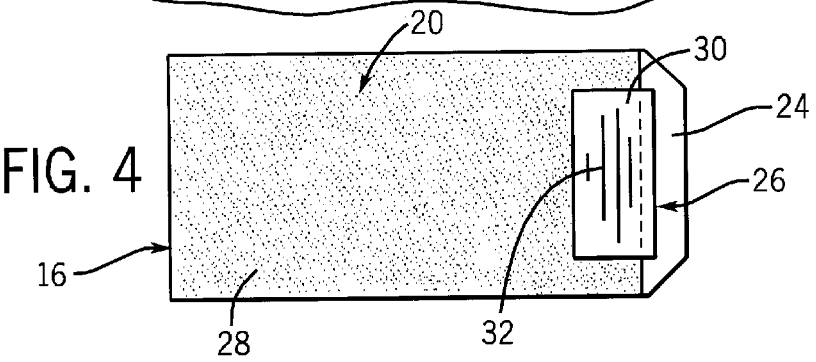
FIG. 4 is a bottom plan view of the label flap of the present invention, further illustrating the position of the coupon.

Referring now to FIGS. 3 and 4, the label flap 16 includes a front surface 18 and a back surface 20. The front surface 18 is generally smooth and may include a label graphic 22, as illustrated in FIG. 1. Referring back to FIG. 4, the back surface 20 of the label flap 16 includes a layer of a removable adhesive 28 that allows the label flap 16 to be repeatedly pealed from the product package 10 and reapplied thereto in order to gain access to the opening 14 and then reseal the product package 10. The resealable adhesive contained on the back surface 20 of the label flap 16 generally retains its adhesive properties during the repeated application and removal of the label flap 16 from the product package 10.

Referring now to FIGS. 2 and 4, the back surface 20 of the label flap 16 includes a starting tab 24 in which the adhesive on the back surface 20 is rendered ineffective or, in the alternative, not present. The starting tab 24 does not adhere to the product package 10 such that the starting tab 24 can be grasped by the user to pull the label flap 16 from the product package as illustrated in FIG. 2.

Figure 5:
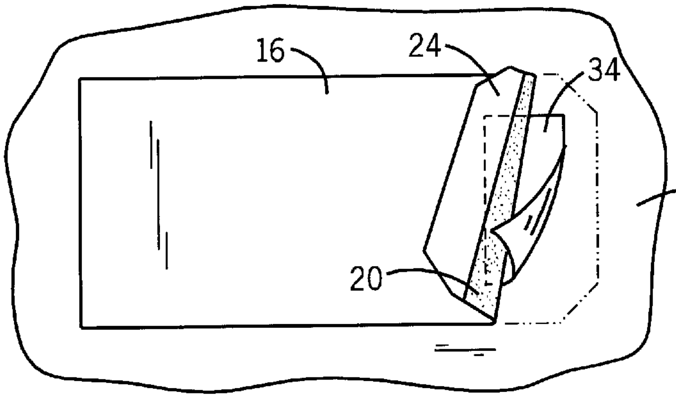
FIG. 5 is a top plan view illustrating the removal of the label flap and uncovering of the associated coupon.
Figure 7:
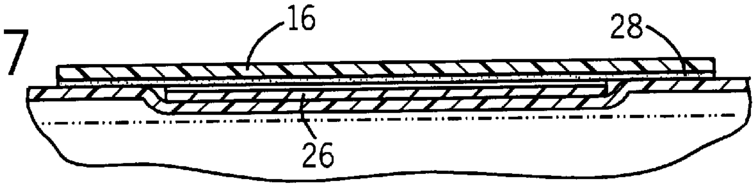
FIG. 7 is a partial section view taken along line 7—7 of FIG. 3.

Referring now to FIGS. 4 and 5, in accordance with the present invention the label flap 16 includes a preprinted coupon 26 positioned in contact with the removable adhesive 28 contained on the back surface 20 of the label flap 16. The coupon 26 includes a back surface 30 that includes a printed coupon graphic 32 and a front surface 34 that includes a release coating. As can be seen in FIG. 4, the coupon 26 has a width that is less than the width of the label flap 16 such that a portion of the removable adhesive 28 contained on the back surface 20 extends past the outer edges of the coupon 26. Thus, when the label flap 16 and coupon 26 are applied to the product package 10, the removable adhesive 28 on the label flap 16 adjacent to the edges of the coupon holds the label flap 16 in contact with the product package 10, as best shown in FIG. 7.

As can be seen in FIG. 4, a portion of the coupon 26 extends over the starting tab 24, which permits easy removal of the coupon 26 from the back surface 20 of the label flap 16. Additionally, when the label flap 16 is first removed, the portion of the coupon extending over the starting tab 24 separates from the label flap 16 and catches the user's attention.

Figure 6:
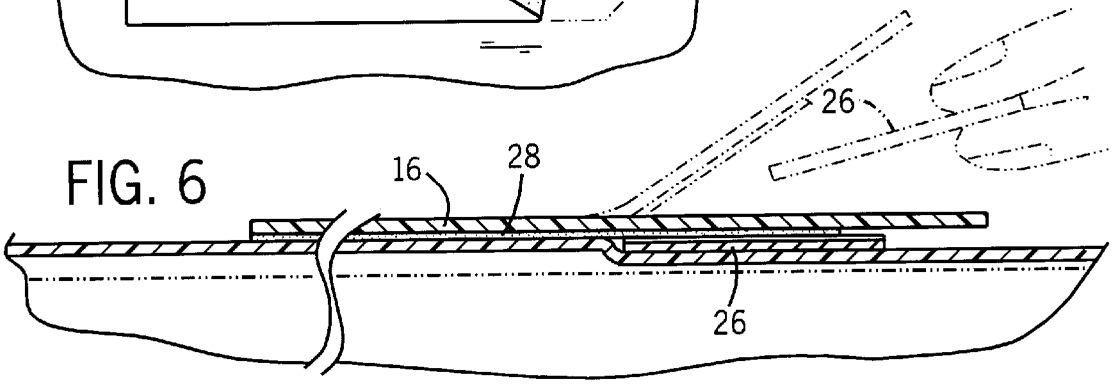
FIG. 6 is a partial section view taken along line 6—6 of FIG. 3 illustrating the removal of the coupon.

Referring now to FIG. 1, when the label flap 16 is applied to the product package 10, the coupon 26 is hidden beneath the label flap 16. Thus, the product purchaser is unaware that a coupon is included with the product package. When the product purchaser initially opens the label flap 16 by grasping the starting tab 24, the coupon 26 is revealed, as illustrated in FIG. 2. Since the coupon 26 extends over a portion of the starting tab 24, the coupon 26 does not adhere to the label flap 16 along this area. As the label flap 16 is pulled further off of the product package 10, the entire coupon 26 is uncovered and the purchaser can grasp the coupon 26 and pull the coupon off of the removable adhesive contained on the back surface 20 of the label flap 16, as illustrated in phantom in FIG. 6. Once the coupon 26 has been removed from the back surface 20 of the label flap, the label flap 16 can be used in a conventional manner to provide an air and water-tight seal around the opening 14 contained in the product package 10.

Figure 8:
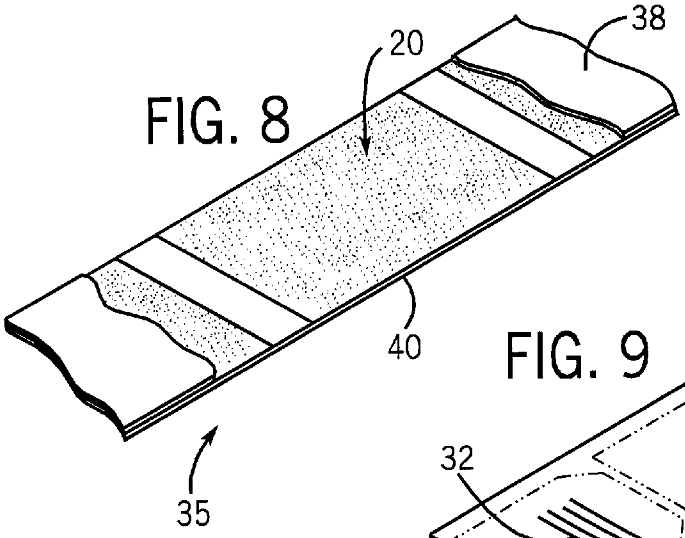
FIG. 8 illustrates the continuous supply of material, including a first release liner and a strip of label material, that form the label and coupon.
Figure 15:
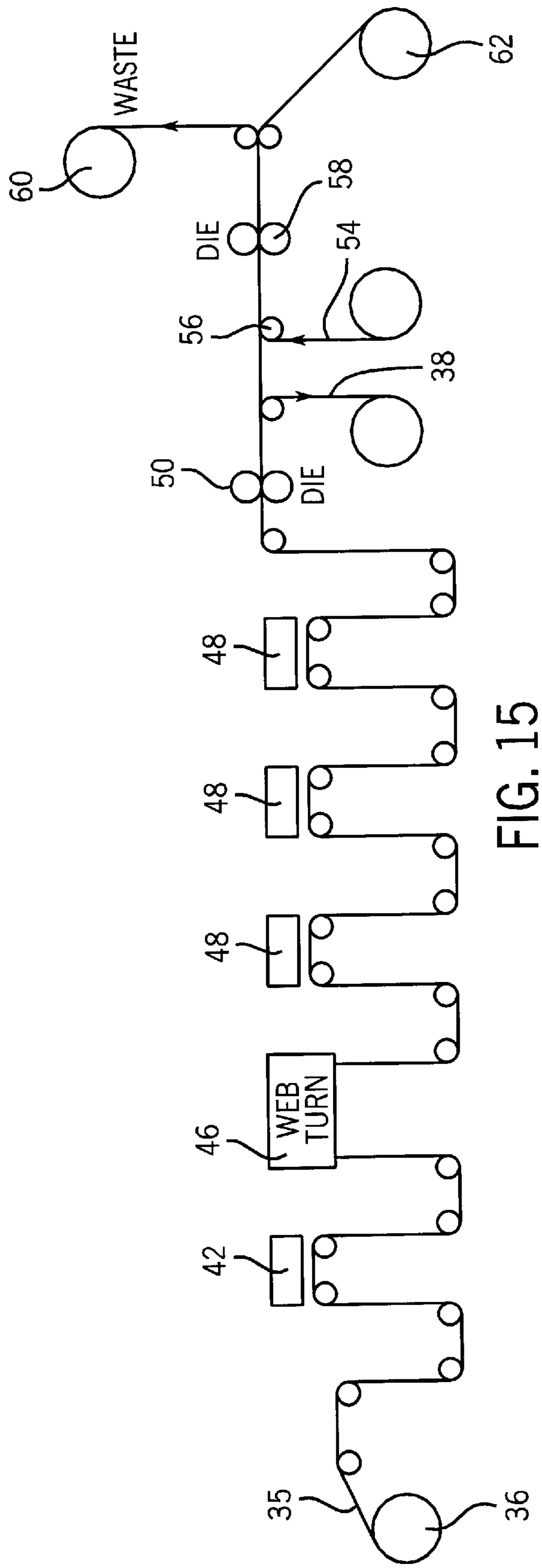
FIG. 15 is a schematic illustration of the process used to form the label assembly of the present invention.

Referring now to FIGS. 8–15, the method and material used during the formation of the label flap assembly described above will now be discussed. Referring first to FIGS. 8 and 15, a continuous supply of base material 35 is received from a roll 36. The supply of base material 35 includes a first release liner 38 and a continuous strip of label material 40. The label material 40 will subsequently be cut into the desired shape for the label flap 16 and include the label flap back surface 20 having a removable pressure-sensitive adhesive applied thereto. The first release liner 38 of the present invention is formed from a paper-based material that includes a wax release layer formed on its front surface, which is in contact with the back surface 20 of the label material 40.

Figure 9:
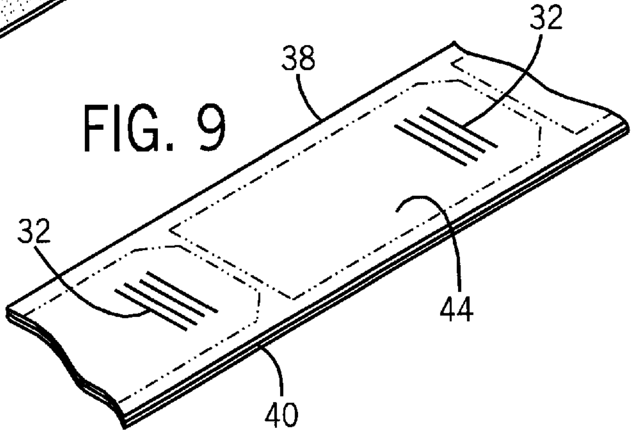
FIG. 9 illustrates the imprinting of a coupon graphic on the first release liner.
Figure 10:
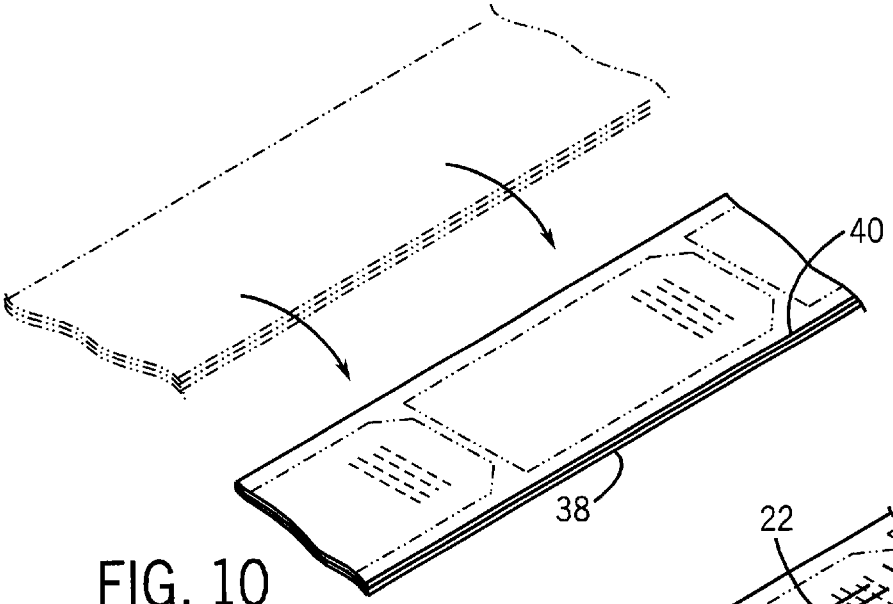
FIG. 10 illustrates the reorientation of the continuous supply of material.

As illustrated in FIG. 15, the supply of base material 35 is fed from the roll 30 over a series of guide rollers until it reaches a coupon printer 42. The coupon printer 42 is a conventional printing mechanism that is used to print the coupon graphics 32 onto the back surface 44 of the first release liner 38. The series of coupon graphics 32 are spaced from each other along the continuous supply of material such that each of the coupon graphics 32 will be aligned with the final shape of each label flap to be formed, as illustrated by the dashed lines in FIG. 9. In FIG. 9, the dashed lines generally outline the desired shape for the label flap 16, although the shape for the label flap 16 is not formed until later in the label formation process.

Once the coupon graphics 32 have been printed, the continuous supply of base material 35 enters into a conventional web turning apparatus 46 which operates to invert the orientation of the continuous supply of base material 35 such that the label material 40 is oriented on top of the first release liner 38.

Figure 11:
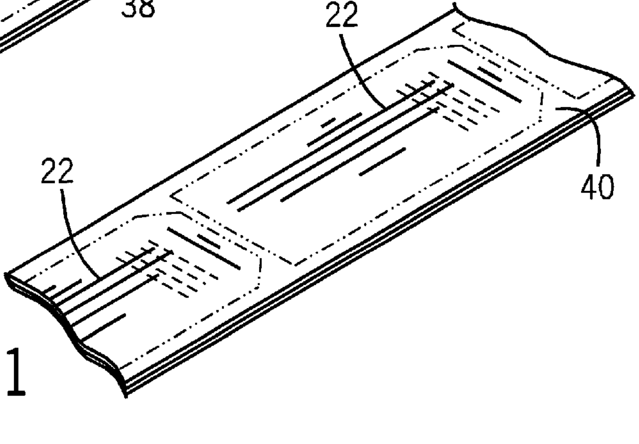
FIG. 11 illustrates the imprinting of a label graphic on the front surface of the label material.

Once the continuous supply of base material has been inverted, the supply of base material 35 is fed through a series of label graphic printers 48. In the preferred embodiment of the invention shown in FIG. 15, three label graphic printers are shown, which can be configured to print either a different color or a different portion of the label graphic as desired by the user. However, it should be understood that either a single or two printers 48 could be used depending on the graphic 22 to be printed. As shown in FIG. 11, the label graphics 22 are spaced along the length of the label material 40 such that the label graphics 22 will be aligned with the final label flap shape illustrated by the dashed lines of FIG. 11.

Figure 12:
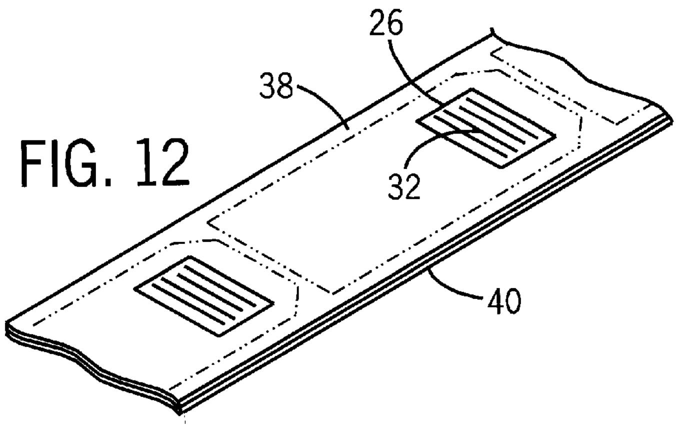
FIG. 12 illustrates the die-cutting of the label from the first release liner.

Once the label graphics 22 have been imprinted on the front surface of the label material 40, the continuous supply of base material 35 is fed through a coupon cutting die 50. The coupon cutting die 50 die-cuts the final shape for the coupon 26 from the first release liner 38 around the imprinted coupon graphic 32 on the back surface of the first release liner 38. As can be seen in FIG. 12, the position of the coupon 26 will be near the starting tab for the label flap 16, which is again illustrated by phantom lines in FIG. 12.

Figure 13:
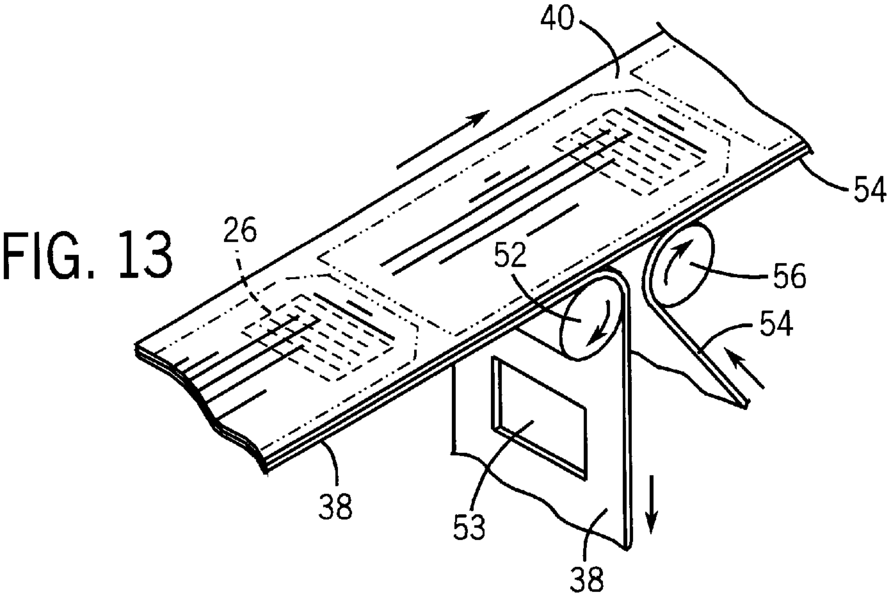
FIG. 13 illustrates the removal of the excess portions of the first release liner from the label material and the application of the label material and attached coupons to a second release liner.
Figure 14:
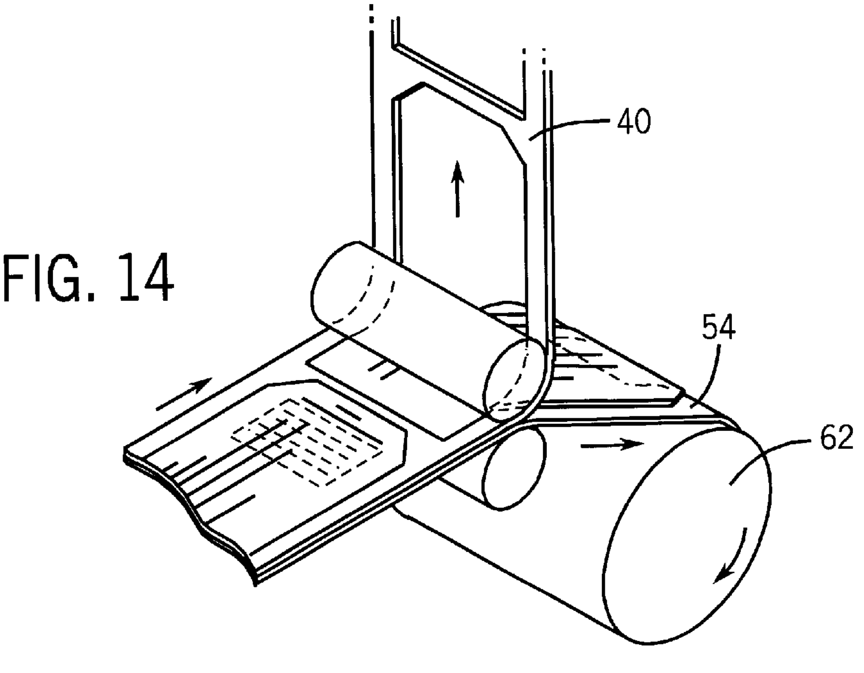
FIG. 14 illustrates the removal of the excess portions of the label material from the second release liner.

Referring now to FIGS. 13 and 15, once the coupons 26 have been die-cut in the first release liner 38, the remaining portions of the first release liner 38 are separated from the label material 40 by passing the first release liner 38 around a removal roller 52. Since the coupon 26 has been die-cut from the first release liner 38, the coupon 26 remains in contact with the back surface 20 of the label material 40 which includes the pressure-sensitive adhesive. The hole 53 shown in the excess first release liner 38 is a result of the coupon 26 remaining in contact with the label material 40.

After the label material 40 and the adhered coupons 26 are separated from the first release liner 38, a second release liner 54 is passed around an application roller 56 and brought into contact with the continuous strip of label material 40 and spaced coupons 26. The second release liner 54 is formed from a more durable material than the first release liner 38 and provides the required support and stability for the label material 40. In the preferred embodiment of the invention, the second release liner 54 is formed from a continuous strip of plastic material to which the pressure sensitive adhesive contained on the back surface 20 of the label material is removably adhered. The use of the second release liner 54 allows the coupon 26 to be formed of larger size, since each coupon 26 is removed from the first release liner 38 during the formation process, rather than right before application of the label flap to the product package. In the prior art label forming systems, such as those shown in the Buske '782 and '271 patents, the coupon is torn from the first release liner immediately prior to its application to a product package. By utilizing the second release liner 54 in accordance with the present invention, the strip of labels can be more easily removed from the second release liner 54 at a later time prior to application to the product package 10. This feature is particularly important in instances where the label formation/printing is done by a facility or provider separate from the formation and filling of the product package 10.

Referring now to FIG. 15, after the second release liner 54 is applied to the label material 40, the label material 40 and the second release liner 54 pass through a label cutting die 58. The label cutting die 58 die-cuts the desired perimeter shape of the label flap 16 into the label material 40. The label cutting die 58 is synchronized such that the final shape of the label flap 16 corresponds to the dashed lines of FIGS. 9–13 that illustrate the desired shape of the label flap 16.

Once the desired shape of the label flap 16 has been die-cut, the excess label material 40 is removed and wrapped around a waste roll 60. The plurality of labels spaced along the continuous length of the second release liner 54, each of which include a coupon 26, are wrapped around a storage roll 62. Once the storage roll 62 includes the desired number of label flaps 16, the storage roll 62 can be removed and shipped to any desired location. For example, the storage roll 62 can be shipped to a product package manufacturer such that the label flaps 16 including the coupons 26 can be applied to individual product packages as they are formed. The increased strength of the second release liner 54 as compared to the first release liner 38 allows greater flexibility in the application of the label flap to the product package since tearing of the release liner 54 is no longer an issue.

As discussed previously, the use of the second release liner 54 to mount the plurality of individual label flaps each including a coupon 26 allows for greater flexibility in the subsequent application of the individual label flaps to a product package. In prior art label forming systems, the coupon 26 was tom from the label liner immediately subsequent to the application of the label to a product package. Since the coupon 26 was die-cut from the label liner, high speed application of labels to product packaging often resulted in tearing of the label liner as the coupon 26 was removed. In the present invention, the coupon 26 is formed from a first release liner 38, and the combined label and coupon are applied to a second release liner 54 prior to removal and application to a product package.

Various alternatives and embodiments are contemplated as being within the scope of the following claims particularly pointing out and distinctly claiming the subject matter regarded as the invention.

I claim:

1. A label assembly comprising:

a plurality of individual resealable label flaps positionable to cover an opening in a package containing removable articles, each label flap having a front surface and a back surface, the back surface including a pressure-sensitive adhesive that permits repeated application and removal of the label flap from the package;

a coupon positioned in contact with the pressure-sensitive adhesive on the back surface of each label flap; and a continuous strip of a liner material onto which the plurality of resealable label flaps and associated coupons are mounted, wherein the coupons are positioned between the label flaps and the liner material such that when the label flaps are removed from the liner material for application to a package, the coupons remain in contact with the pressure-sensitive adhesive on the back surface of each label flap.

2. The label assembly of claim 1 wherein each coupon includes a printed coupon graphic.

3. The label assembly of claim 2 wherein the coupon includes a front surface in contact with the pressure-sensitive adhesive on the back surface of the label flap and a back surface that contains the coupon graphic.

4. The label assembly of claim 1 further comprising a starting tab formed on each of the resealable label flaps, wherein the pressure-sensitive adhesive contained on the back surface of the label is rendered ineffective along the starting tab.

5. The label assembly of claim 4 wherein each coupon extends over at least a portion of the starting tab such that the portion of the coupon extending over the starting tab is not adhered to the label flap and can be grasped to remove the coupon from the label flap.

6. The label assembly of claim 1 wherein the coupon is formed from paper and the liner material is plastic.

7. The label assembly of claim 1 wherein the coupon is formed in a first liner and separated from the first liner by removal of the label from the first liner.

8. A resealable label flap positionable to cover an opening in a package containing removable articles, the label flap comprising:

a front surface and a back surface, the back surface of the label flap including a pressure-sensitive adhesive that permits the repeated application and removal of the label flap from the package;

a starting tab formed on a first end of the label flap, wherein the pressure sensitive adhesive on the back surface of the label flap is rendered ineffective along the starting tab such that the starting tab does not adhere to the package and can be grasped to remove the label flap from the package; and a coupon positioned in contact with the pressure-sensitive adhesive on the back surface of the label flap such that the coupon is positioned between the back surface of the label flap and the package, wherein at least a portion of the coupon extends over at least a portion of the starting tab, wherein when the label flap is removed from the package by grasping the starting tab, the coupon remains attached to the back surface of the label flap and can be removed from the label flap by grasping the portion of the coupon extending over the starting tab.

9. The resealable-label flap of claim 8 wherein the coupon includes a front surface and a back surface, the front surface of the coupon being in contact with the pressure-sensitive adhesive on the back surface of the label flap and the back surface including a printed coupon graphic.

* * * * *